April 2, 1968 T. C. LEONARD 3,376,495

ADJUSTABLE BIAS NETWORK FOR MICROWAVE FREQUENCY DIODE MULTIPLIERS

Filed July 7, 1966 2 Sheets-Sheet 1

INVENTOR.
THOMAS C. LEONARD

BY Wm. J. Nolan
ATTORNEY

April 2, 1968 T. C. LEONARD 3,376,495

ADJUSTABLE BIAS NETWORK FOR MICROWAVE FREQUENCY DIODE MULTIPLIERS

Filed July 7, 1966 2 Sheets-Sheet 2

INVENTOR.
THOMAS C. LEONARD

BY

ATTORNEY 3,376,495

ADJUSTABLE BIAS NETWORK FOR MICROWAVE FREQUENCY DIODE MULTIPLIERS

Thomas C. Leonard, Topsfield, Mass., assignor to Varian Associates, Palo Alto, Calif., a corporation of California Filed July 7, 1966, Ser. No. 563,551
7 Claims. (Cl. 321—69)

Figure 1:
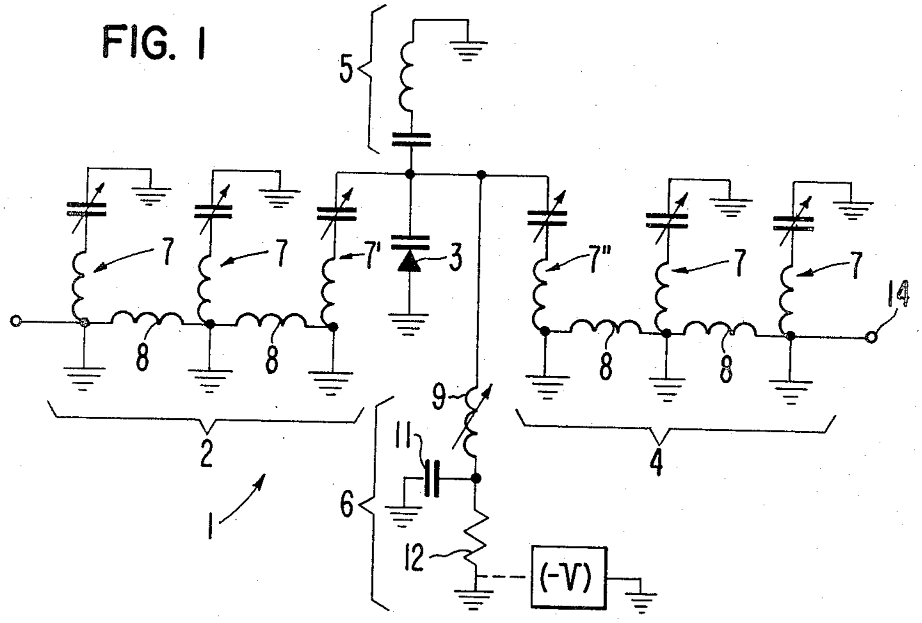

The present invention relates in general to microwave frequency electrically variable capacitance diode multipliers and, more particularly, to an improved adjustable network for applying the proper bias to the diode, whereby the variable parameters of diodes, as supplied from the manufacturer, may be properly matched by the adjustable bias network during assembly of the multiplier to obtain optimum output performance of the multiplier. Microwave frequency multipliers incorporating the improved bias network of the present invention are especially useful as sources of microwave power from L to X band.

Heretofore, microwave varactor multipliers have been built. Such multipliers typically include an input band-pass filter network tuned for the input signal with the varactor diode multiplier connected across the input network. An output band pass filter network is also connected across the varactor diode and tuned to an even or odd harmonic of the input network. Varactor multipliers which multiply by 3 or more typically also include one or more idler circuits connected across the varactor diode and tuned for intermediate harmonically related frequencies between the input and output frequencies of the multiplier. In addition, a network typically including a radio frequency choke, bypass capacitor, and resistor are connected to the varactor diode for applying the operating bias voltage to the diode.

The output performance of a microwave varactor frequency multiplier is critically dependent upon the right combination of values of the inductance, capacitance, and resistance of the bias network. The bias problem is further complicated by the fact that no two varactor diodes, as supplied by the manufacturer, require the identically same combination of values of L, C and R at microwave frequencies. In addition, at microwave frequencies, say above 500 MHz., the inductive portions of these circuits are formed by lengths of transmission line excited in the TEM mode.

Capacitors are formed by closely spacing two metal portions of the TEM mode line. Thus, adjustment of the inductive and capacitive parameters of the prior bias network at microwave frequencies to obtain the right combination of values of L, C and R for the varactor diode was a tedious and cumbersome process of cut and try.

In the present invention, the coaxial or TEM mode line segment of the varactor bias network is provided with a plug which includes a sliding contact riding on the center conductor of the coaxial line to determine choke inductance and a built in capacitor connected in shunt with the coaxial line to serve as the bypass capacitor. Adjustment of the position of the plug along the coaxial line adjusts the inductance L of the bias network to obtain the proper value of inductance as seen by the varactor diode. In a preferred embodiment, the resistor of the bias network is also contained in the plug. The proper value of resistance is obtained by substitution of various plugs having different values of resistance until the correct combination of resistance is obtained. Using this method and apparatus, for determining the proper values of the bias network, greatly simplifies final adjustment and construction of the microwave varactor frequency multipliers.

The principal object of the present invention is the provision of an electrically variable capacitance diode microwave frequency multiplier which is characterized by ease of construction and adjustment.

One feature of the present invention is the provision of an adjustable plug movable within a TEM mode transmission line segment of the bias network of a microwave frequency electrically variable capacitance diode type frequency multiplier, such plug including a movable friction type electrical contact with the center conductor of the TEM mode line for adjustment of the choke reactance and a built in bypass capacitor connected in shunt across the TEM mode line, whereby adjustment of the bias network is facilitated during manufacture thereof.

Another feature of the present invention is the same as the preceding feature wherein the plug also includes a resistor which may form either the current limiting resistor of an externally biased diode circuit or the self biasing resistor for a self biased diode.

Another feature of the present invention is the same as any one or more of the preceding features wherein the plug is threaded and axially screwed into a TEM mode coaxial line for adjustment thereof.

Figure 2:
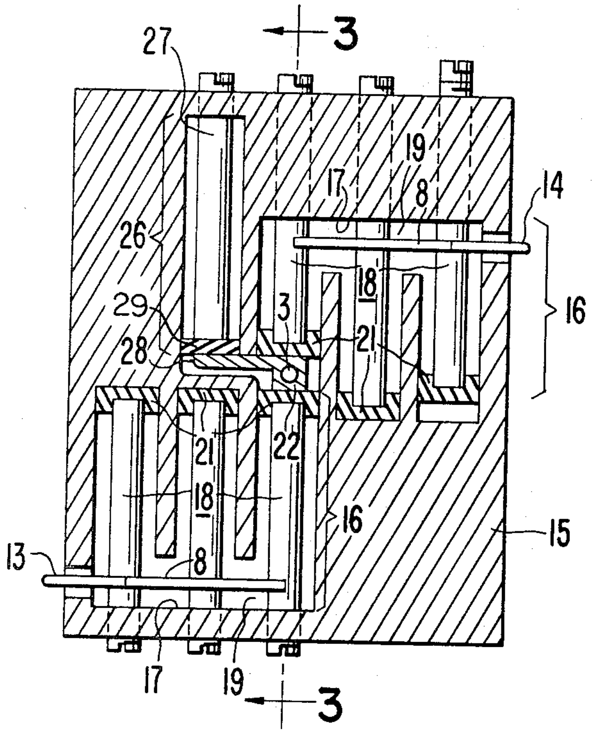
Figure 3:
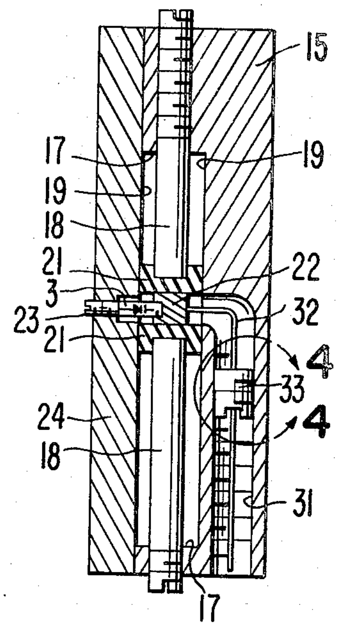
Figure 4:
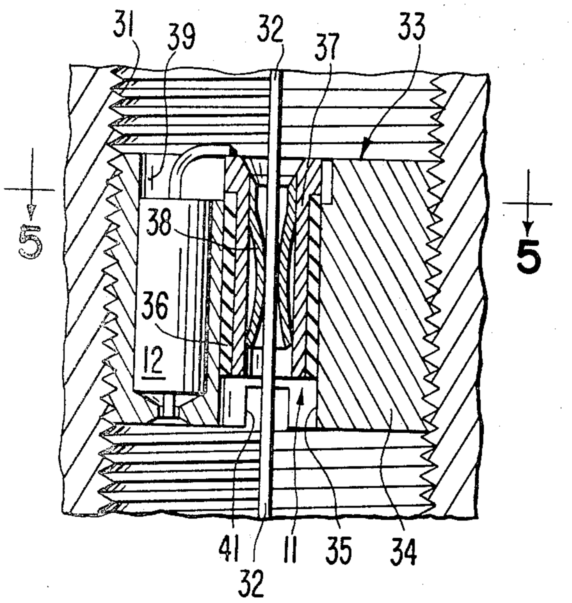
Figure 6:
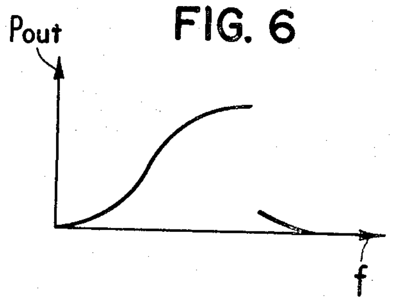
Figure 7:
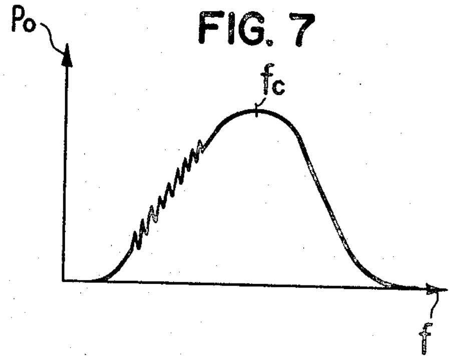
Figure 5:
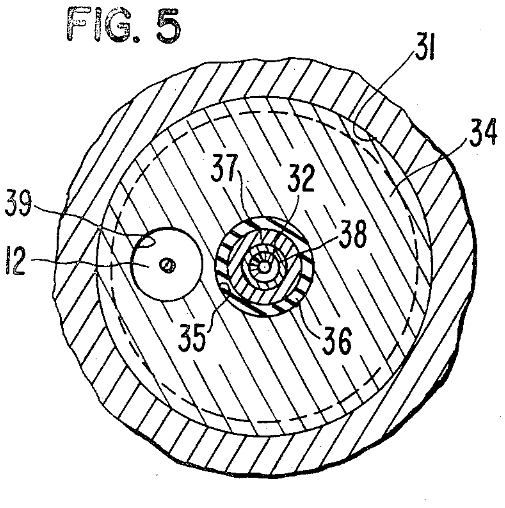
Figure 8:
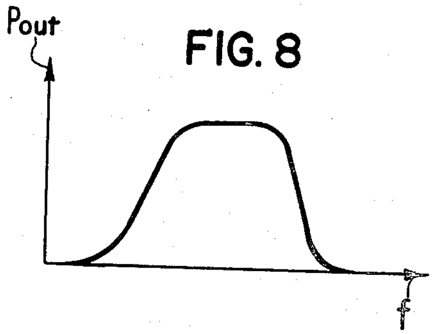

Other features and advantages of the present invention will become apparent upon a perusal of the following specification taken in connection with the accompanying drawings wherein:

FIG. 1 is a schematic equivalent circuit diagram for a varactor frequency multiplier employing features of the present invention, FIG. 2 is transverse plan view of a frequency multiplier employing features of the present invention, FIG. 3 is a sectional view of the structure of FIG. 2 taken along line 3—3 in the direction of the arrows, FIG. 4 is an enlarged sectional view of a portion of the structure of FIG. 3 delineated by line 4—4, FIG. 5 is a view of the structure of FIG. 4 taken along line 5—5 in the direction of the arrows, FIG. 6 is a plot of power output versus frequency output of a microwave varactor multiplier with improper bias, FIG. 7 is a plot similar to that of FIG. 6 showing output with another type of improper bias, and FIG. 8 is a plot similar to that of FIG. 6 showing output performance with proper bias.

Referring now to FIG. 1 there is shown the equivalent circuit 1 for the electrically variable capacitance diode (varactor) multiplier of the present invention. The circuit includes a three pole band pass filter input circuit 2 tuned to pass the signal to be multiplied by a varactor diode 3 connected across the output end of the input circuit 2. A similar three pole output band pass filter circuit 4 has its input end connected across the varactor diode 3 and is tuned to pass the multiplied output signal from the varactor 3 at some harmonic of the input signal such as, for example, the third harmonic. An idler circuit 5 is connected across the varactor 3 and series tuned to pass the difference frequency between the input frequency and the output frequency when considering the capacitance of the varactor 3 as part of the series idler circuit 5.

A varactor bias circuit 6 is also connected across the varactor diode 3 for applying the proper bias voltage thereto.

Each of the band pass input and output circuits 2 and 4 comprises a three pole filter network formed by three series resonant circuit loops 7 which are inductively coupled together by a coupling strap 8. The output loop 7′ of the input filter 2 and the input loop 7″ of the output filter 4 are each tuned for series resonance at their respective band pass frequencies when taking into consideration the capacitance of the varactor diode 3.

The bias circuit 6 includes a variable radio frequency choke 9 and a bypass capacitor 11. For self bias, a resistor 12 is connected in parallel to ground with the bypass capacitor 11. For external bias, the resistor 12 serves as a current limiting resistor between the varactor and a bias voltage source (−V). The external bias connection is shown in dotted lines.

A signal to be multiplied such as, for example, at 1 gHz. is applied to an input terminal 13. The multiplied output signal at, for example, 3 gHz. is extracted from an output terminal 14.

Referring now to FIGS. 2 and 3 there is shown a typical multiplier of the present invention. The circuit is formed in a conductive block of metal 15 as of aluminum. The input and output filter circuits 2 and 4 are each formed by three sections of coaxial line excited in the TEM mode. Each of the circuit loops 7 is formed by a series resonant section of coaxial line. The resonant sections of line each include an inductive section 16 which is less than a quarter wavelength long. The inductive coaxial line segments are shorted at one end by a conductive short circuit 17 between the center conductive rod 18 and the side walls 19 of the coaxial line segment 16. A capacitor 21 is formed at the non-shorted end of the rod 18 by a dielectric support collar. The rods 18 are threaded at their shorted end and are screwed into the metal block 15 for adjustment of their tuning. Screwing the rods 18 in or out of the block changes predominately the capacitance between the end of the rods 18 and the adjacent metal surface to vary the series capacitance of the tuned circuit loop 7. A pair of coupling straps 8 couple together the inductive ends of the rods 18.

The input and output circuits 2 and 4 are coupled to the varactor diode by being capacitively coupled to a metal block 22 as of copper disposed between the capacitive ends of the last rod 18 of the input circuit 2 and the first rod 18 of the output circuit 4. The diode 3 has one contact held against the metal block 22 by a screw 23 which is threaded through a hole in a top metal cover 24 to bear against the other contact of the diode 3.

The idler circuit 5 is formed by a single series resonant section of coaxial line 26. The section of line includes an inductive segment formed by a shorted length of coaxial line with the center conductor rod 27 being threaded through the shorted end of the line. The other end of the line segment 26 is capacitively coupled to a conductive arm portion 28 of the varactor diode block 22 by means of dielectric block 29.

The varactor diode bias circuit 6 is located in the block 15 below the plane of the input and output circuits 2 and 4. An internally threaded bore 31 defines the outer conductor of a coaxial line. The bore, at its inner end, turns up to open into the diode block 22. A thin piano wire 32 as of 0.025″ diameter steel is connected at one end to the diode block 22 and is threaded through the center of the bore 31 to form the center conductor of a high impedance TEM modes coaxial line segment. An externally threaded metallic plug 33 makes sliding electrical contact with the wire 32 passing therethrough and is screwed into the bore 31. The plug includes a built in bypass capacitor 11 and resistor 12 and serves to short the coaxial line segment. By varying the position of the plug 33 along the coaxial line segment the choke inductance of the bias circuit 6 is variably determined by the length of the coaxial line between the plug 33 and the diode block 22.

Referring now to FIGS. 4 and 5 the plug 33 will be shown and described in greater detail. The plug 33 comprises a cylindrical body portion 34 as of brass which is cadmium plated and about 0.250″ long and 0.300″ in diameter. The plug is centrally axially bored at 35 to receive a tubular dielectric sleeve 36 as of Teflon of 0.012″ wall thickness. A brass sleeve 37 as of 0.012″ wall thickness is coaxially inserted within the dielectric sleeve to form the inner capacitor plate of the bypass capacitor 11. A tubular spring contact member 38, as of beryllium copper, is mounted within the tubular sleeve 37 to make a sliding frictional electrical contact with the piano wire 32 which passes through the spring contact member 38. An off center axial bore 39 is provided in the plug body 34 to house a subminiature 1/10 watt bias resistor 12 which may vary from 10KΩ to 100KΩ resistance. One terminal of the resistor 12 is connected to the conductive sleeve 37. The other end of the resistor 12 may be connected to the body portion 34 of the plug 33, for a self bias varactor diode circuit, or may be connected to an external bias voltage source (−V) for an externally biased varactor diode circuit. A slot 41 is cut in the back of the plug 34 to permit turning of the plug 33 for screwing it in and out of the threaded bore 31 for adjustment of the bias circuit 6.

Referring now to FIGS. 6–8 proper adjustment of the bias circuit 6 will be explained. The input signal to be multiplied is swept in frequency to sweep the output frequency through its expected band of operation. The power output response versus frequency is observed on an oscilloscope. The desired response is as shown in FIG. 8. If the bias circuit values of L and R are improper for the particular varactor diode 3 the response may appear as shown in FIGS. 6 and 7. In the response of FIG. 6, incoherent oscillations are observed on the skirts of the output response. In the response of FIG. 7, the output is discontinuous over the operating band.

A number of plugs 33 are made up with different values of resistance for resistor 12. The plug 33 is screwed into the bore 31 while observing the output response. If a full adjustment of one plug 33 is not adequate to obtain the desired response of FIG. 8 then successively different plugs 33 are tried with different values of resistance until the proper response is obtained. Typically, the bias voltage falls within the range of between 1/4 and 1/3 of the diode breakdown voltage but the critical parameters of the bias network are the values of L and R.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A microwave varactor frequency multiplier including; means forming an electrically variable capacitance diode; means for applying a signal to said diode means to produce frequency multiplication thereof to a microwave frequency; means forming an output circuit connected to said diode means for extracting the microwave output signal; means forming a diode bias circuit connected to said diode means for applying a bias signal thereto; said bias circuit means including, means forming a length of TEM mode transmission line having a center conductor, means forming a plug closing an end of said transmission line; said plug including, means providing a movable friction electrical contact with the center conductor of said transmission line, and means forming a capacitor integral with and movable with said plug and connected between said center conductor and the outer conductor of said transmission line, whereby adjustment of the position of said plug along said transmission line determines the choke inductance of said diode bias circuit to facilitate adjustment of the frequency multiplier.

2. The apparatus of claim 1 wherein said plug also includes, means forming a resistor with one terminal thereof connected to said center conductor of said transmission line via said movable contact means.

3. The apparatus of claim 1 wherein said transmission line is a section of coaxial line, wherein said plug is threaded, wherein the outer conductor of said transmission line is threaded, and wherein said plug is screwed axially into said transmission line.

4. The apparatus of claim 1 wherein said friction contact means of said plug is a spring concentrically threaded over said center conductor of said transmission line and gripping same, and including a conductive sleeve member conductively connected to and surrounding said spring, and wherein said bypass capacitor means is formed by a dielectric sleeve disposed inbetween said conductive sleeve and a surrounding metallic body portion of said plug which portion makes electrical contact with the outer conductor of said TEM mode transmission line.

5. The apparatus of claim 4 wherein said plug includes a bore, and a resistor mounted in said bore with one terminal of said resistor being conductively connected to said center conductor of said TEM mode line via said conductive sleeve and spring.

6. The apparatus of claim 5 wherein said TEM mode line is a coaxial line, wherein said plug is cylindrical and threaded on its outside, wherein the outer conductor of said coaxial line is internally threaded, and wherein said plug is screwed axially into the outer conductor of said coaxial line.

7. The apparatus of claim 6 wherein said resistor is connected in parallel with said bypass capacitor across said coaxial line for self biasing of said varactor diode.

References Cited

UNITED STATES PATENTS

| | | | |
|---|---|---|---|
| 3,155,914 | 11/1964 | Vice et al. | 330—4.9 |
| 3,263,154 | 7/1966 | Steele | 321—69 |
| 3,287,621 | 11/1966 | Weaver | 321—69 |

JOHN F. COUCH, *Primary Examiner.*

G. GOLDBERG, *Assistant Examiner.*